(12) United States Patent
Shah

(10) Patent No.: US 6,739,166 B1
(45) Date of Patent: May 25, 2004

(54) METHOD OF FORMING TUBULAR MEMBER WITH FLANGE

(75) Inventor: Sanjay M. Shah, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/321,227

(22) Filed: Dec. 17, 2002

(51) Int. Cl.[7] ............................................. B21D 26/02
(52) U.S. Cl. ...................... 72/57; 72/55; 72/58; 72/367; 72/370; 29/421.1
(58) Field of Search ............................ 72/55, 57, 58, 72/61, 62, 367, 369, 370; 29/421.1

(56) References Cited

U.S. PATENT DOCUMENTS

| | | | |
|---|---|---|---|
| 5,070,717 A | 12/1991 | Boyd et al. | 72/55 |
| RE33,990 E | * 7/1992 | Cudini | 72/367 |
| 5,458,393 A | 10/1995 | Benedyk | |
| 5,720,092 A | 2/1998 | Ni et al. | |
| 6,092,865 A | 7/2000 | Jackel et al. | |
| 6,112,567 A | * 9/2000 | Birkert | 72/58 |
| 6,247,344 B1 | * 6/2001 | Eipper | 72/61 |
| 6,257,035 B1 | * 7/2001 | Marks et al. | 72/57 |
| 6,263,720 B1 | * 7/2001 | Valin | 72/370.13 |
| 6,302,478 B1 | 10/2001 | Jackel et al. | |
| 6,394,335 B2 | * 5/2002 | Meier et al. | 228/144 |
| 2001/0042986 A1 | 11/2001 | Patelczyk | |

* cited by examiner

Primary Examiner—David B. Jones
(74) Attorney, Agent, or Firm—Laura C. Hargitt

(57) ABSTRACT

A method of forming a tubular member with at least one flange includes the steps of providing a tubular member, expanding at least one portion of the tubular member, and positioning the tubular member between open die halves. The method includes the steps of applying at least nominal internal hydraulic pressure to the tubular member. The method further includes the steps of progressively closing the die halves to progressively deform the tubular member and progressively expel the at least one portion of the tubular member to define a flange comprised of wall portions of the tubular member engaging one another. The method includes the steps of increasing the hydraulic pressure to expand and conform the tubular member. The method also includes the steps of separating the die halves and removing the tubular member having a flange from the die.

20 Claims, 4 Drawing Sheets

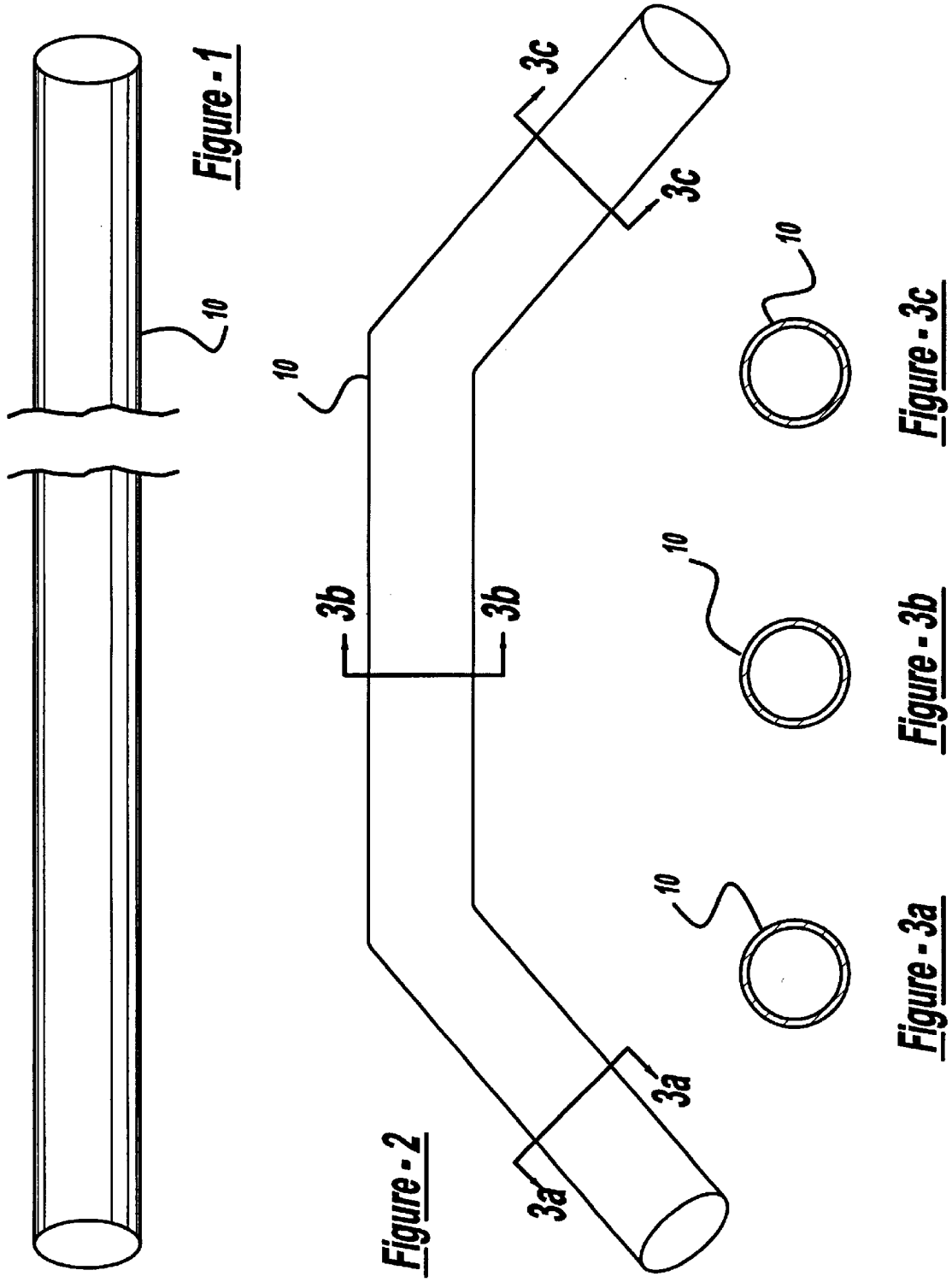

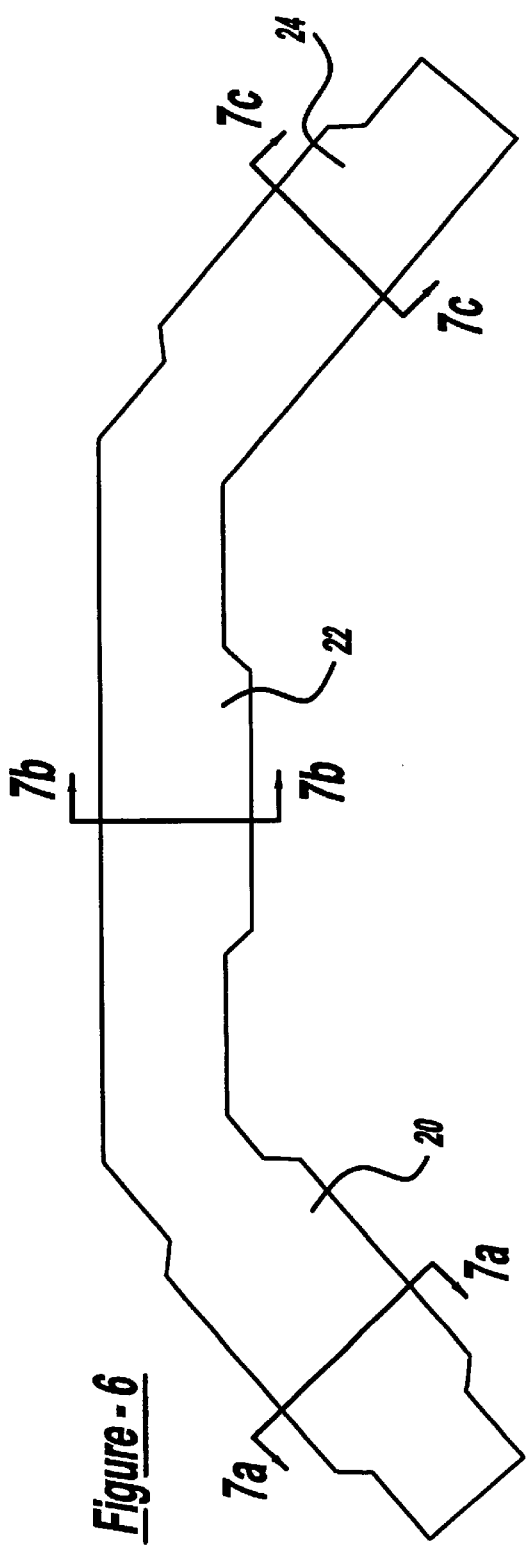
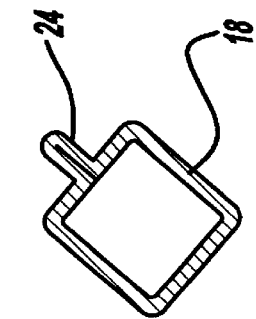
*Figure - 7c*
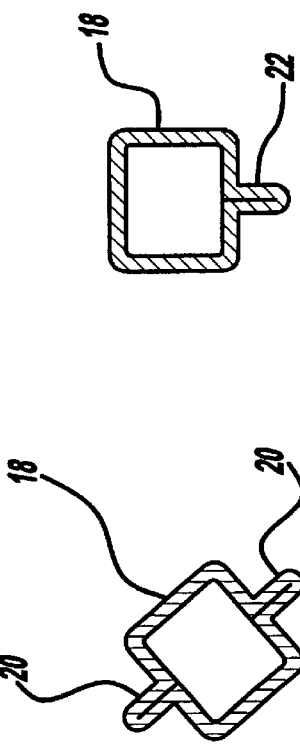
*Figure - 7b*
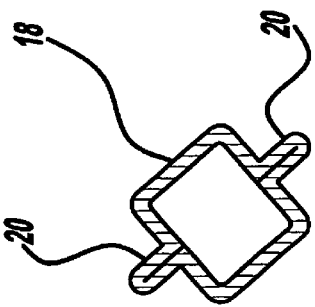
*Figure - 7a*

US 6,739,166 B1

METHOD OF FORMING TUBULAR MEMBER WITH FLANGE

TECHNICAL FIELD

The present invention relates generally to forming a shaped tubular member and, more particularly, to a method of forming a tubular member with a flange of hydroformed metal tubing for assembling automotive structures.

BACKGROUND OF THE INVENTION

It is known to form a cross-sectional profile of a tubular member by a hydro-forming process in which a fluid filled tubular blank is placed within a die and then the die is closed so that the tubular blank is pinched within the die. Fluid pressure is then increased inside the tubular member to expand the blank outwardly against the die cavity to provide a tubular product having a die formed cross-sectional profile. The tubular product may also have different cross-sectional profiles along the length thereof.

It is also known to form a tubular member with a flange. An example of such a tubular member with a flange is disclosed in U.S. Pat. No. 5,070,717 to Boyd. In this patent, a method of forming a flanged-tubular member is accomplished by sizing the tubular blank to the largest cross-section circumferential measure of the desired end product. Then, a hydro-forming die and process is used to expand any excess circumferential measure into a flange defining portion of the die cavity to thereby enable the formation of a cross-section of lesser cross-sectional measure than the largest cross-section. The flange may be trimmed as desired to shorten the length of the flange, in which case, welding or other suitable attachment processes may be employed to join the flanges together to strengthen the tubular member.

However, the flange is created from the original tube diameter section. The tubular member is selected based on the biggest section. Thus, if a longer flange is needed, and/or larger section size is needed, it requires using a bigger diameter tube, thus adding mass and cost, which is undesired. In addition, the tubular member is pinched where sections required are smaller. Further, the flange has to be trimmed and welded to keep the section closed (if required).

As a result, it is desirable to provide a new method of forming a tubular member with a flange. It is also desirable to provide a method of forming a tubular member with a flange that allows smaller diameter tubes to be used. It is further desirable to provide a method of forming a tubular member with integral flanges where needed. Therefore, there is a need in the art to provide a method of forming a tubular member with a flange that meets these desires.

SUMMARY OF THE INVENTION

It is, therefore, one object of the present invention to provide a new method of forming a tubular member with a flange.

It is another object of the present invention to provide a method of forming a tubular member with integral flanges where needed.

To achieve the foregoing objects, the present invention is a method of forming a tubular member with at least one flange. The method includes the steps of providing a tubular member. The method also includes the steps of expanding at least one portion of the tubular member and positioning the tubular member between open die halves mating with one another to define a tubular cavity portion and a flange cavity portion. The method includes the steps of applying at least nominal internal hydraulic pressure to the tubular member. The method further includes the steps of progressively closing the die halves to progressively deform the tubular member within the tubular cavity portion and progressively expel the at least one portion of the tubular member into the flange cavity portion to define a flange comprised of wall portions of the tubular member engaging one another. The method includes the steps of increasing the hydraulic pressure to expand and conform the tubular member to the tubular cavity portion. The method also includes the steps of separating the die halves and removing the tubular member having a flange from the die.

One advantage of the present invention is that a method of forming a tubular member with an integral flange is provided for a vehicle, eliminating extra welding of stamped flanges. Another advantage of the present invention is that the method allows the use of smaller diameter tube, resulting in less cost and mass. Yet another advantage of the present invention is that the method allows easier assembly of tubular members. Still another advantage of the present invention is that the method provides multiple flanges on a single tubular member. A further advantage of the present invention is that the method creates flanges where the tubular member needs it.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is an elevational view of a tubular member, which has been bent to a desired shape of a finished tubular product.

FIG. 2 is a plan view of the tubular member of FIG. 1.

FIGS. 3a through 3c are sectional views taken along lines 3a—3a, 3b—3b, and 3c—3c of FIG. 2.

FIG. 6 is a plan view of one embodiment of a tubular member with flanges, which has been bent to a desired shape of a finished tubular product.

FIGS. 7a through 7c are sectional views taken along lines 7a—7a, 7b—7b, and 7c—7c of FIG. 6.

DESCRIPTION OF THE PREFERRED EMBODIMENT

Figure 4:
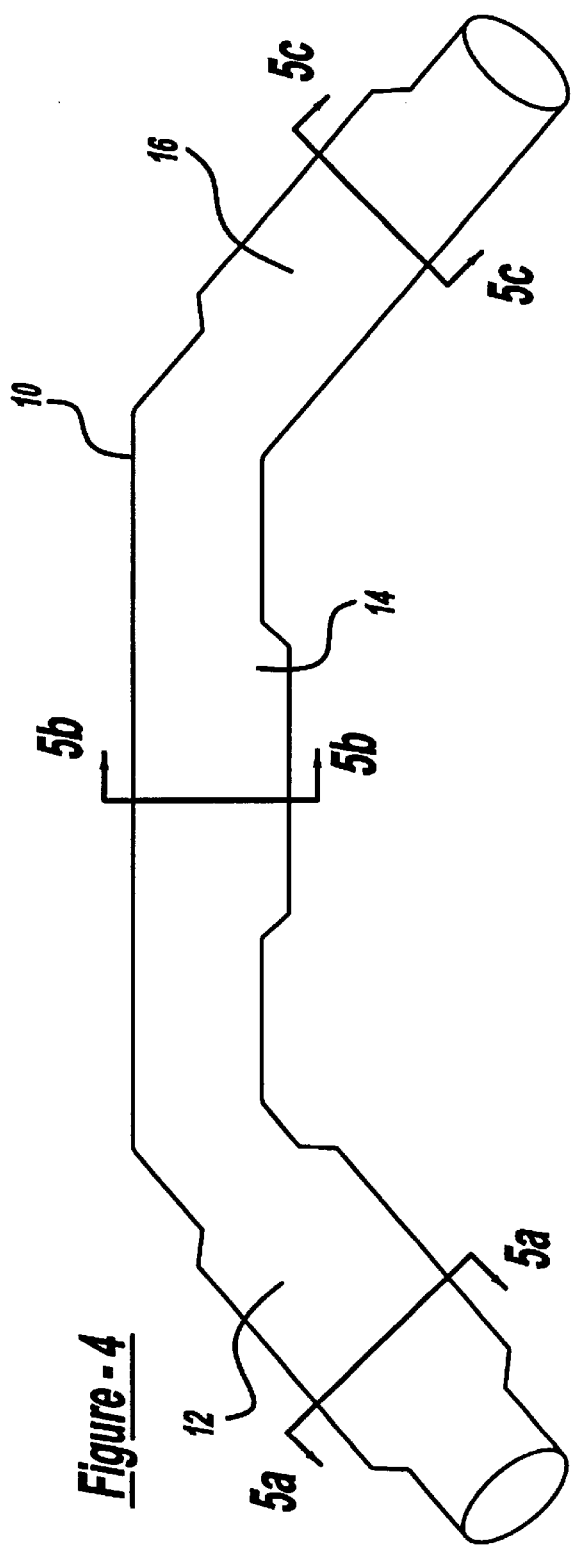
FIG. 4 is a plan view of one embodiment of a tubular member with flanges, which has been bent to a desired shape of a finished tubular product.

Referring to the drawings and in particular FIGS. 1 through 3c, one embodiment of a tubular blank or member 10 is shown for use in carrying out a method, according to the present invention, of forming a tubular member with a flange for assembly in automotive structures (not shown). The method includes the step of providing the tubular member 10. The tubular member 10 is made of a metal material. In one embodiment, the tubular member 10 has a generally circular cross-sectional shape and extends axially. The method includes the step of bending the tubular member 10 to a predetermined position. In the embodiment illustrated, the tubular member 10 has been bent to a predetermined position such as having generally "L" shaped ends through a suitable bending process such as mandrel bending, stretch bending, or die bending. It should be appreciated that the tubular member 10, as illustrated, has the same diameter circular cross-section throughout its length. It should also be appreciated that an optimum diameter of the tubular member 10 is selected based on manufacturing and product needs.

Figure 5C:
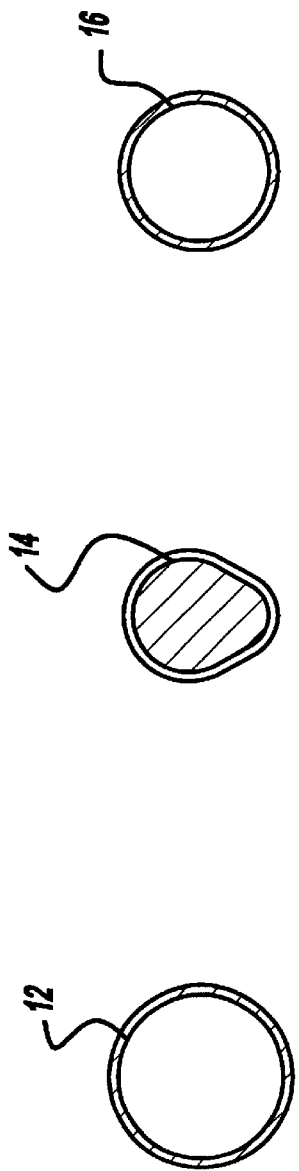
FIGS. 5a through 5c are sectional views taken along lines 5a—5a, 5b—5b, and 5c—5c of FIG. 4.
Figure 5B:
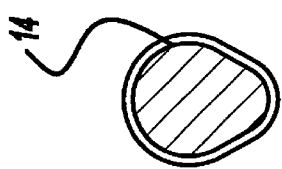
Figure 5A:
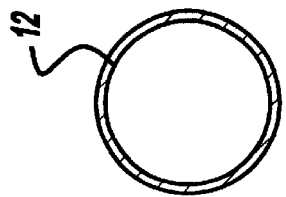

Referring to FIGS. 4 through 5c, the method includes the step of expanding at least one portion of the tubular member 10 to form at least one flange. In the embodiment illustrated, the tubular member 10 has three portions 12, 14, and 16 expanded to provide additional material length needed for the flanges. As illustrated in FIGS. 4 and 5a, the portion 12 is expanded to form a generally circular cross-sectional shape having a diameter larger than a diameter of the remainder of the tubular member 10. As illustrated in FIGS. 4 and 5b, the portion 14 is expanded to form a generally teardrop cross-sectional shape having a size larger than a diameter of the remainder of the tubular member 10. As illustrated in FIGS. 4 and 5c, the portion 16 is expanded to form a generally oblong cross-sectional shape having a size larger than a diameter of the remainder of the tubular member 10. The selective expansion is accomplished through a suitable expanding process such as a hydroforming process, fluid pressure, or mechanical forming to pre-expand the portions 12, 14, and 16 of the tubular member 10 after bending of the tubular member 10, if required. It should be appreciated that the portions 12, 14, and 16 create additional material at selected locations, which then can be pinched (by trapping between two die surfaces or cam surfaces), thus creating flanges. It should also be appreciated that if the original tubular member 10 does not have enough section material for pinching, then circular pre-expansion is recommended. It should further be appreciated that during pre-expansion, the shape of the portions 12, 14, and 16 can be non-circular during and after pre-expansion.

Referring to FIGS. 6 through 7c, the finished tubular product or member 18 is shown. The finished tubular member 18 has at least one flange. In the embodiment illustrated, the finished tubular member 18 has three flanges 20, 22, and 24 corresponding to the portions 12, 14, and 16, respectively, on the tubular member 10. The flanges 20,22, 24 are integral, unitary, and one-piece with the tubular member 18. It should be appreciated that the flanges 20, 22, and 24 are created during hydroforming. It should also be appreciated that the orientation, size, and number of flanges 20,22,24 can vary. It should further be appreciated that positioning the selectively expanded tubular member 10 in a hydroforming die will then yield the flanges 20,22,24.

Figure 8:
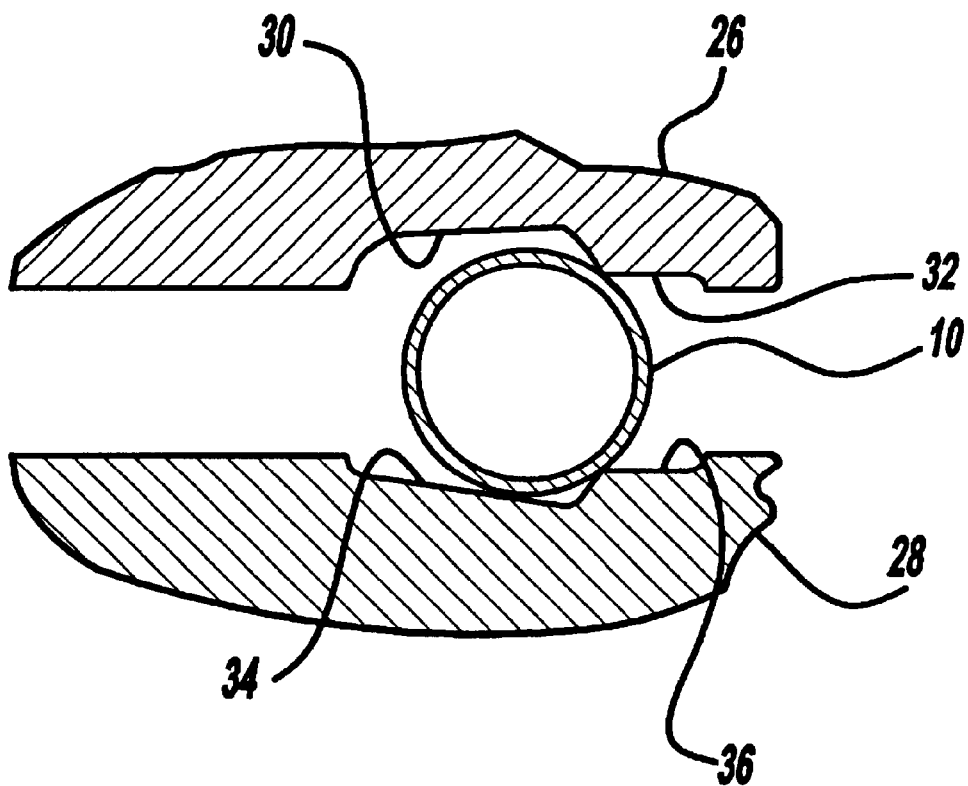
FIG. 8 is a cross-sectional view of the tubular member of FIG. 1 placed between the halves of a die set.

The method also includes the step of hydroforming the tubular member 10 to form the finished tubular member 18. As illustrated in FIG. 8, the tubular member 10 is placed in a die set comprised of an upper die half 26 and a lower die half 28. The upper die half 26 includes a tubular forming cavity portion 30 and a flange forming cavity portion 32. Likewise, the lower die half 28 includes a tubular forming cavity portion 34 and a flange forming cavity portion 36. It should be appreciated that a combined cross-sectional circumferential measure of the tubular forming cavity portions 30 and 34 and the length of the flange forming cavity portions 32 and 36 total up to generally equal to or slightly greater than the cross-section perimeter length of the tubular member 10.

The ends of the tubular member 10 are sealed and hydraulic fluid is pumped into the tubular member 10 under pressure. The upper die half 26 and lower die half 28 are progressively closed so that the tubular member 10 is progressively flattened and the pressurized fluid captured therein expands the walls of the tubular member 10 into the cavities of the die. In particular, the tubular member 10 is expelled and forced to migrate laterally into the flange forming cavity portions 32 and 36. It should be appreciated that, during hydroforming, the tubular member 10 is placed such that during die closing (or additional camming action) the flanges 20,22,24 are formed.

The die halves 26 and 28 are fully closed upon one another with the tubular member 10 being tightly clamped between the die halves 26 and 28 to define a flange 20,22,24, the remainder of the tubular member 10 having been irregularly bowed or dished inwardly. During this closing of the die halves 26 and 28, a relatively constant hydraulic pressure may be maintained within the tubular member 10 by incorporating a pressure relief valve (not shown) into the seal enclosing the ends of the tubular member 10 so that hydraulic fluid may be forced from the tubular member 10 as it collapses.

Once the die is closed, the tubular member 10 is then expanded to a final cross-sectional profile by increasing the hydraulic pressure sufficient to exceed the yield limit of the tubular member 10 so that the tubular member 10 is forced into conformity with the tubular forming cavity portions 30 and 34 of the die halves 26 and 28. The die halves 26 and 28 are then opened to permit, removal of the finished tubular member 18 with the flanges 20,22,24 from the die halves 26 and 28. The finished tubular member 18 may be assembled into a vehicle body (not shown) with the flange 20,22,24 employed to mount a weather-strip (not shown) or some other desired vehicle component. It should be appreciated that the die halves 26 and 28 are designed to provide the desired cross-sectional tubular shape with any remaining unused wall portion of the tube then relegated to being displaced into the flange portion of the tubular member. It should also be appreciated that the flange 20,22,24 may be trimmed to desired length or joined together by suitable means such as welding.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of forming a tubular member with at least one flange comprising the steps of:

providing a tubular member;

pre-expanding at least one portion of the tubular member;

positioning the tubular member between open die halves mating with one another to define a tubular cavity portion and a flange cavity portion;

applying at least nominal internal hydraulic pressure to the tubular member;

progressively closing the die halves to progressively deform the tubular member within the tubular cavity portion and progressively expel the at least one portion of the tubular member into the flange cavity portion to define a flange comprised of wall portions of the tubular member engaging one another;

increasing the hydraulic pressure to expand and conform the tubular member to the tubular cavity portion;

separating the die halves; and removing the tubular member having at least one flange from the die.

2. A method as set forth in claim 1 including the step of bending the tubular member to a predetermined position prior to said step of pre-expanding.

3. A method as set forth in claim 1 wherein said step of providing a tubular member comprises providing a tubular member having a generally circular cross-sectional shape.

4. A method as set forth in claim 1 wherein said step of pre-expanding comprises pre-expanding at least one portion of the tubular member by fluid pressure.

5. A method as set forth in claim 1 wherein said step of pre-expanding comprises pre-expanding at least one portion of the tubular member to have a size greater than a diameter of a remainder of the tubular member.

6. A method as set forth in claim 1 wherein said step of pre-expanding comprises pre-expanding at least one portion of the tubular member to have a cross-sectional shape different from a cross-sectional shape of a remainder of the tubular member.

7. A method as set forth in claim 6 wherein the cross-sectional shape of the at least one portion is one of circular, teardrop, or oblong.

8. A method as set forth in claim 1 wherein the at least one flange is integral, unitary, and one-piece with the tubular member.

9. A method as set forth in claim 1 wherein the at least one flange is formed on at least one side of the tubular member.

10. A method as set forth in claim 1 wherein the tubular member is made of a metal material.

11. A method of forming a tubular member with at least one flange comprising the steps of:

providing a metal tubular member;

pre-expanding a plurality of portions of the tubular member;

positioning the tubular member between open die halves mating with one another to define a tubular cavity portion and a plurality of flange cavity portions;

applying at least nominal internal hydraulic pressure to the tubular member;

progressively closing the die halves to progressively deform the tubular member within the tubular cavity portion and progressively expel the portions of the tubular member into the flange cavity portions to define flanges comprised of wall portions of the tubular member engaging one another;

increasing the hydraulic pressure to expand and conform the tubular member to the tubular cavity portion;

separating the die halves; and removing the tubular member having a plurality of flanges from the die.

12. A method as set forth in claim 11 including the step of bending the tubular member to a predetermined position prior to said step of pre-expanding.

13. A method as set forth in claim 11 wherein said step of providing a tubular member comprises providing a tubular member having a generally circular cross-sectional shape.

14. A method as set forth in claim 11 wherein said step of pre-expanding comprises pre-expanding the portions of the tubular member by fluid pressure.

15. A method as set forth in claim 11 wherein said step of pre-expanding comprises pre-expanding the portions of the tubular member to have a size greater than a diameter of a remainder of the tubular member.

16. A method as set forth in claim 11 wherein said step of pre-expanding comprises pre-expanding the portions of the tubular member to have a cross-sectional shape different from a cross-sectional shape of a remainder of the tubular member.

17. A method as set forth in claim 16 wherein the cross-sectional shape of the portions is one of circular, teardrop, or oblong.

18. A method as set forth in claim 11 wherein the flanges are integral, unitary, and one-piece with the tubular member.

19. A method as set forth in claim 11 wherein the flanges are formed on at least one side of the tubular member.

20. A method of forming a tubular member with at least one flange comprising the steps of:

providing a metal tubular member;

bending the tubular member to a predetermined position;

pre-expanding a plurality of portions of the tubular member;

positioning the tubular member between open die halves mating with one another to define a tubular cavity portion and a plurality of flange cavity portions;

applying at least nominal internal hydraulic pressure to the tubular member;

progressively closing the die halves to progressively deform the tubular member within the tubular cavity portion and progressively expel the portions of the tubular member into the flange cavity portions to define flanges comprised of wall portions of the tubular member engaging one another;

increasing the hydraulic pressure to expand and conform the tubular member to the tubular cavity portion;

separating the die halves; and removing the tubular member having a plurality of flanges from the die.

* * * * *